(12) United States Patent
Usui (10) Patent No.: US 6,544,403 B2
(45) Date of Patent: Apr. 8, 2003

(54) METHOD FOR MANUFACTURING FLUID BEARING

(75) Inventor: Motonori Usui, Nagano (JP)

(73) Assignee: Sankyo Seiki Mfg., Co., Ltd., Nagano (JP)

( * ) Notice: Subject to any disclaimer, the term of this patent is extended or adjusted under 35 U.S.C. 154(b) by 47 days.

(21) Appl. No.: 09/733,213

(22) Filed: Dec. 8, 2000

(65) Prior Publication Data

US 2002/0126923 A1 Sep. 12, 2002

(30) Foreign Application Priority Data

Dec. 15, 1999 (JP) ............................. 11-355635

(51) Int. Cl.[7] ................................ B23H 3/10
(52) U.S. Cl. ................. 205/666; 205/670; 205/672
(58) Field of Search .................. 205/653, 654, 205/666–667, 672, 668–670; 204/224 M, 272

(56) References Cited

U.S. PATENT DOCUMENTS

| 4,073,710 A | * | 2/1978 | Visser | 205/666 X |
| 4,690,737 A | * | 9/1987 | Vishnitsky | 204/272 X |
| 4,711,706 A | * | 12/1987 | Wasel et al. | 205/667 |
| 6,264,822 B1 | * | 7/2001 | Wei et al. | 205/666 |

* cited by examiner

Primary Examiner—Donald R. Valentine
(74) Attorney, Agent, or Firm—Hogan & Hartson, LLP (57) ABSTRACT

A method for manufacturing a fluid bearing is provided. A mask member having at least two sets of grooves provided at least two places along an axial direction is affixed to an outer surface of an electrode section of a fluid bearing manufacturing tool. Each of the groove sets consists of multiple grooves in a shape corresponding to designed fluid bearing grooves on a work piece, such as, for example, a sleeve section of the fluid bearing. The fluid bearing manufacturing tool is inserted into a hole created in the work piece, wherein a power source for electrolytic machining is connected between the fluid bearing manufacturing tool and the work piece. An electrolytic solution between the manufacturing tool and the work piece is allowed to flow to form fluid bearing grooves on an inner surface of the work piece through electrolytic machining.

14 Claims, 7 Drawing Sheets

A: Non-dissolved section
B: Selectively dissolved section
C: Entirely dissolved section

Fig. 8

Relation between Machined Width and
Tool Width by Different Voltages

METHOD FOR MANUFACTURING FLUID BEARING

BACKGROUND OF THE INVENTION

1. Field of the Invention

The present invention relates to a method for manufacturing a fluid bearing with two bearings, such as a thrust bearing and a radial bearing, and to a fluid bearing manufactured by the method.

2. Description of Related Art

Figure 11:
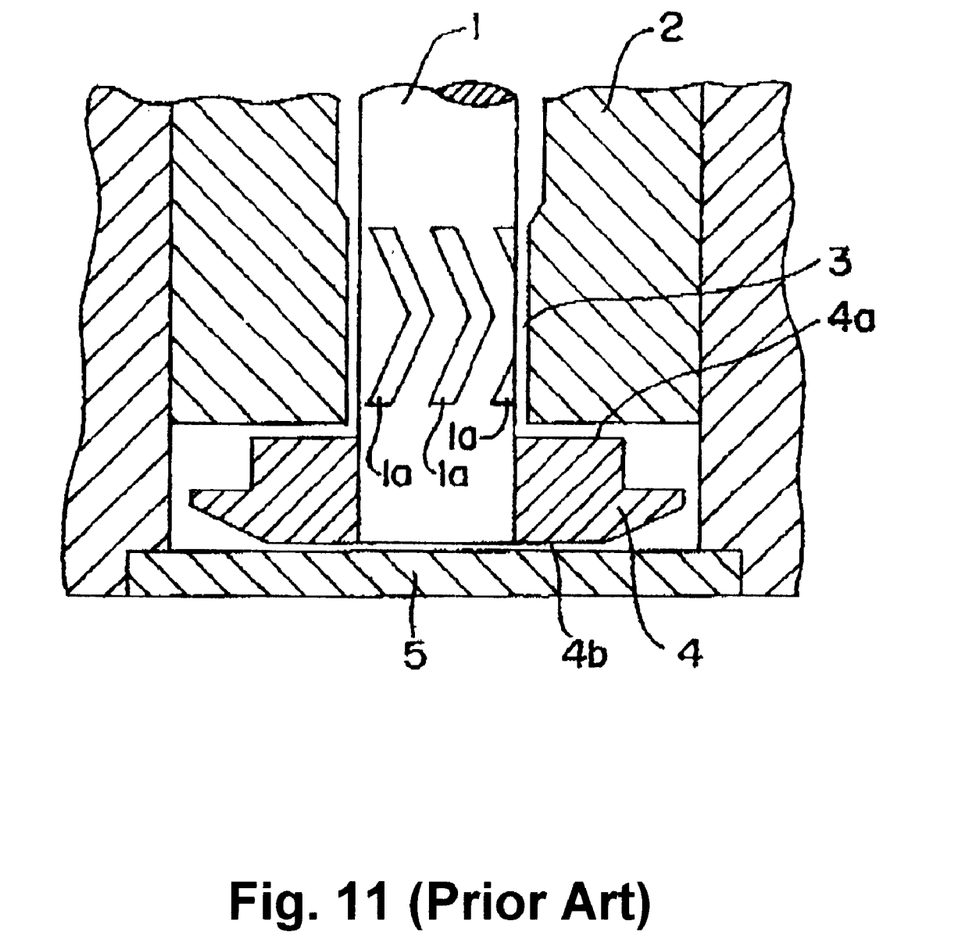
FIG. 11 is a cross-sectional view of an example of a conventional fluid bearing.

FIG. 11 shows an example of a conventional fluid bearing. As shown in the figure, a shaft 1 with grooves 1a for generating radial dynamic pressure is inserted into an inner hole of a bearing 2. The bottom end of the shaft 1 is press-fitted in a thrust plate 4 that is provided with thrust dynamic pressure bearing grooves 4a and 4b at its top and bottom surfaces. The thrust plate 4 is interposed between a counter plate 5 situated under the shaft 1 and the bearing 2. The counter plate 5 is fixed to the bearing 2 with an adhesive to seal the bearing 2 to complete a bearing assembly.

A radial dynamic pressure bearing 3 is formed between the shaft 1 and the bearing 2, and the dynamic pressure bearing works to support the shaft 1, in a manner that the shaft 1 is freely rotatable. Thrust dynamic pressure bearings 4a and 4b are formed between the thrust plate 4 that is press-fitted at the bottom end of the shaft 1 and the counter plate 5 placed at the opening on the bottom end of the bearing 2 and functioning as a lid to seal the bottom end of the bearing 2, and between the thrust plate 4 and the side of the bearing 2 facing the thrust plate 4. The thrust dynamic pressure bearings support the thrust load.

In this way, the conventional fluid bearing functionally separates the thrust bearing and the radial bearing and is structured to have these separate functions with separate parts. Furthermore, the two bearings are manufactured using different machining methods. For example, radial bearings are manufactured by cutting or rolling machining, whereas thrust bearings are manufactured by press machining, edging machining or electrolytic machining.

As a result, in a conventional fluid bearing such as the one described above, separate structures for the radial bearing and the thrust bearing make it difficult to obtain a highly accurate perpendicularity between the radial and thrust bearings; and the lack of perpendicularity have an impact on the performance of the motor itself.

Furthermore, because the radial bearing and the thrust bearing have separate structures, it is difficult to maintain optimal spaces both between the shaft and the radial bearing and between the shaft and the thrust bearing. This consequently makes it difficult to maintain a balance between the radial force and the thrust force.

Moreover, the conventional fluid bearing is likely to lack in press-fit strength between the thrust plate 4 and the shaft 1. On the other hand, when the press-fit strength is increased, problems such as stress fatigue and destruction likely occur.

In addition, the separate structures for radial and thrust bearings result in a large number of parts, and numerous process steps in the assembly that require high precision, such as press-fitting the shaft 1 and the like, which cause increased cost.

SUMMARY OR THE INVENTION

The present invention has been made to solve the problems described above existing in prior arts. It is an object of the present invention to provide method for manufacturing a fluid bearing in which two sets of bearing grooves, i.e., thrust bearing grooves and radial bearing grooves, are integrally formed to have a unitary structure, which achieves a high roundness and a high perpendicularity, and has few parts to allow cost reduction. It is also an object of the present invention to provide fluid bearings manufactured by the method.

In accordance with one embodiment of the present invention, a method for manufacturing a fluid bearing includes the steps of inserting a fluid bearing manufacturing tool into a hole created in a work piece and flowing a electrolytic solution between the manufacturing tool and the work piece, wherein a power source for electrolytic machining is connected between the manufacturing tool and work piece, and forming grooves for fluid bearing on an inner surface of the work piece through electrolytic machining. In one aspect of the embodiment, a mask member having at least two sets of grooves provided at least two places along an axial direction is fixed on the outer surface of an electrode section of the manufacturing tool to which the power source for electrolytic machining is connected. Each of the groove sets consists of multiple grooves in a shape corresponding to the fluid bearing grooves. An electrolytic solution is allowed to flow into the grooves on the mask member to simultaneously form fluid bearing grooves at two places along the axial direction on the inner surface of the work piece facing the respective groove sets.

As a result, the fluid bearing grooves can be simultaneously formed at at least two places, and more preferably, at two places, through electrolytic machining on the inner surface of the work piece facing each of the groove sets provided in the mask member. Accordingly, at least two radial bearings or a thrust bearing and a radial bearing can be formed in a unitary structure, which allows the manufacture of fluid bearings with superior perpendicularity and greatly improved quality.

Moreover, because the grooves are formed by electrolytic machining, burrs that may occur in mechanical machining are not created on the work piece, and metal chips within the grooves will be dissolved and discharged such that metal-burning by metal chips does not occur. As a result, the quality can be significantly stabilized.

In accordance with the embodiment, an electrolytic solution pathway may preferably be formed inside the electrode section of the manufacturing tool to allow the electrolytic solution to branch out and flow to the groove sets at two places on the mask member along the axial direction. The mask member adhere closely to the inner circumferential surface of the work piece, such that the electrolytic solution flows only to the grooves on the mask member, in order to form fluid bearing grooves on the inner surface of the work piece facing the groove sets.

By having the mask member closely adhere to the inner surface of the work piece and by having the electrolytic solution flow only to the grooves on the mask member to perform electrolytic machining, the machining time is shortened to 5~10 seconds, a large number of grooves can be readily formed, and the machining cost can be reduced.

In accordance with one embodiment of the present invention, the electrode section of the manufacturing tool is provided with at least two groove forming surfaces, and more preferably at two places, along the axial direction where the mask member is attached. The groove forming surfaces form an angle $\theta$ with respect to the axial direction, where the angle $\theta$ is $0° \leq \theta \leq 90°$. In a preferred embodiment, one of the groove forming surfaces of the manufacturing tool extends in the axial direction, and the other of the groove forming surfaces is angled at an angle θ with respect to the axial direction, where the angle θ is 0°≦θ≦90°.

As a result, two sets of grooves for two radial bearings or a set of grooves for a radial bearing and a set of grooves for a thrust bearing at a specified angle with respect to the radial bearing set of grooves can be formed simultaneously.

In accordance with one embodiment of the present invention, a method for manufacturing a fluid bearing includes the steps of inserting a work piece into a hole created in a fluid bearing manufacturing tool and flowing a electrolytic solution between the manufacturing tool and the work piece, wherein a power source for electrolytic machining is connected between the manufacturing tool and work piece, and forming grooves for fluid bearing on an outer surface of the work piece through electrolytic machining. In one aspect of the embodiment, a mask member having at least two sets of grooves provided at least two places along an axial direction is fixed on the inner surface of an electrode section of the manufacturing tool to which the power source for electrolytic machining is connected. Each of the groove sets consists of multiple grooves in a shape corresponding to the fluid bearing grooves. An electrolytic solution is flown into the grooves on the mask member to simultaneously form fluid bearing grooves at two places along the axial direction on the outer surface of the work piece facing the respective groove sets.

In accordance with the embodiment, a mask member with a set of grooves, the set consisting of multiple grooves in a shape corresponding to the fluid bearing grooves at at least two places along the direction of the shaft, is fixed on the inner surface of the electrode section of the manufacturing tool to which the power source for electrolytic machining is connected. An electrolytic solution is flown into the grooves on the mask member, to simultaneously form fluid bearing grooves at two places along an axial direction of the work piece on the outer surface of the work piece facing the respective groove sets. As a result, two radial bearings or a thrust bearing and a radial bearing can be integrally formed as a unitary structure, which would result in superior perpendicularity, greatly improved quality and significantly improved motor performance.

In addition, because the grooves are formed by electrolytic machining, burrs that may occur in mechanical machining are not created on the work piece, and metal chips within the grooves will be dissolved and discharged such that metal-burning by metal chips does not occur. As a result, the quality can be significantly stabilized.

In this invention, by having an electrolytic solution pathway formed inside the electrode section of the manufacturing tool to allow the electrolytic solution to branch out and flow to groove sets at two places on the mask member along the direction of the shaft and by having the mask member adhere closely to the outer surface of the work piece, the machining time can be shortened and numerous grooves can be readily formed, thereby reducing the machining cost.

In accordance with another embodiment of the present invention, a fluid bearing has a bearing and a rotary shaft rotatably supported by the bearing, in which at least two groove sets of to generate dynamic pressure are formed on the inner surface of the bearing and/or on the outer surface of the rotary shaft at two places along an axial direction of the rotary shaft. Each of the groove sets consists of multiple grooves. Lubrication fluid is allowed in the grooves to generate dynamic pressure by the relative rotation between the rotary shaft and the bearing. The two groove sets form an angle θ against the axial direction of the rotary shaft, where the angle θ is in the range 0°≦θ≦90°, and each of the grooves has a rectangular cross-sectional shape formed by electrolytic machining.

In a preferred embodiment, one of the groove sets extends in the axial direction of the rotary shaft, and the other groove set extends at an angle θ with respect to the axial direction of the rotary shaft wherein the angle θ in the range 0°≦θ90°.

In accordance with the present invention, the groove sets consisting of multiple grooves are located at two places along the axial direction of the rotary shaft and the two groove sets form an angle θ, where the angle θ is in the range of 0°≦θ≦90°, and the cross-sectional shape of each of the grooves is rectangular. As a result, a fluid bearing with different sets of bearings, such as, for example, two radial bearings, a set of thrust and radial bearings or the like, can be readily manufactured by changing the angle θ (0°~90°).

Other features and advantages of the invention will be apparent from the following detailed description, taken in conjunction with the accompanying drawings that illustrate, by way of example, various features of embodiments of the invention.

EMBODIMENTS OF THE INVENTION

Embodiments of fluid bearing manufacturing methods and of fluid bearings manufactured by the methods are described below with reference tot he accompanying drawings.

Figure 1:
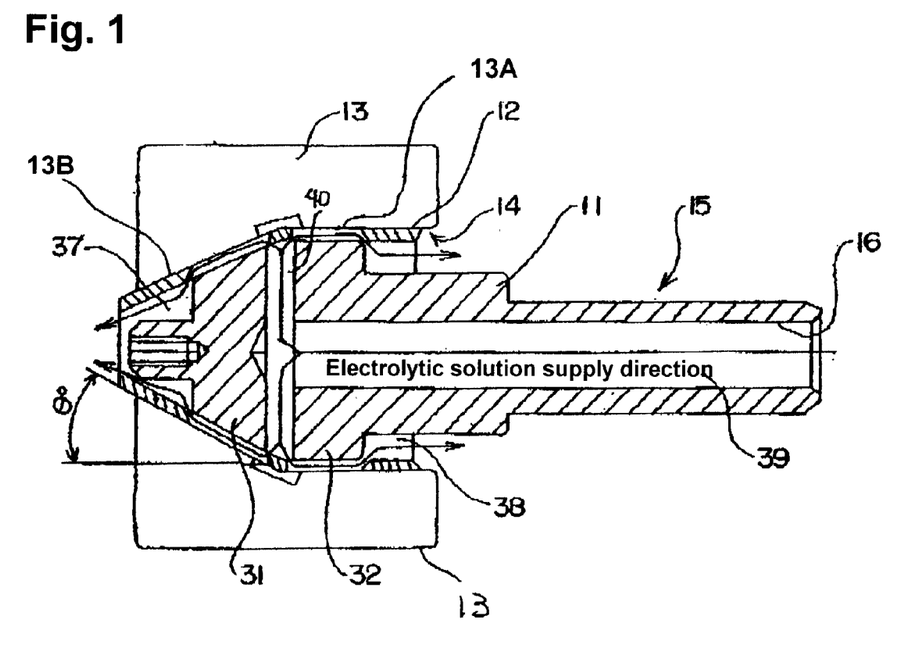
FIG. 1 is a cross-sectional view of a fluid bearing in accordance with an embodiment of the present invention.

In the embodiments described below, a fluid bearing has two bearings with dynamic pressure generating grooves, such as a thrust bearing and a radial bearing, formed as a single part in a unitary structure. The two bearings may be provided on a sleeve section, i.e., a bearing, or on a rotary shaft. FIG. 1 shows an example of a method of manufacturing a fluid bearing in which dynamic pressure generating grooves for both the thrust bearing and radial bearing are formed.

FIG. 1 shows a work piece 13 (i.e., a sleeve, in other words, a bearing) in which grooves are to be formed on the inside of the work piece 13 by a fluid bearing manufacturing tool 15. The work piece 13 is provided with a bore 14 at a center thereof. The fluid bearing manufacturing tool 15 is inserted in the bore 14 and a power source for electrolytic machining is connected between the manufacturing tool 15 and the work piece 13. An electrolytic solution is allowed to flow on the inner circumferential surface of the work piece 13 that forms the bore 14, to thereby simultaneously form grooves for thrust dynamic pressure and for radial dynamic pressure through electrolytic machining on the inner circumferential surface of the work piece 13.

A portion of the fluid bearing manufacturing tool 15 that faces the inner circumferential surface of the work piece 13 (on the left side of the figure) defines an electrode section 11. The external shape of the electrode section 11 corresponds to the shape of the bore 14 of the work piece 13 so that it can fit with the bore 14. In one embodiment, as shown in FIG. 1, the bore 14 of the work piece 13 consists of a cylindrical inner surface 13A and a conical inner surface 13B. The cylindrical inner surface 13A is parallel to the axial direction of the fluid bearing manufacturing tool 15 and which becomes a radial bearing, and the conical inner surface 13B defines an angle θ against the axial direction the fluid bearing manufacturing tool 15 and which becomes a thrust bearing. An external configuration of the electrode section 11 corresponds to the inner surfaces of the bore 14. Accordingly, an end section of the fluid bearing manufacturing tool 15 forms a cone section 31 for thrust bearing that defines an angle θ with respect to the axial direction. Another part of the fluid bearing manufacturing tool 15 defines a cylinder section 32 for radial bearing which corresponds to the cylindrical inner surface 13A of the work piece 13 and is parallel to the axial direction.

Figure 2:
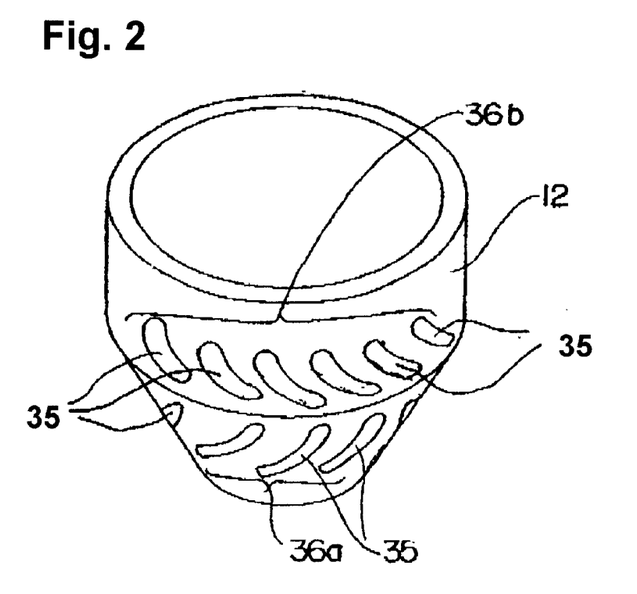
FIG. 2 is a perspective view of a mask member that in accordance with an embodiment of the invention.

A mask member 12 made of an insulating material is affixed to the outer circumferential surface of the electrode section 11 that corresponds the cylindrical inner surface 13A and conical inner surface 13B of the work piece 13. The mask member 12 has a shape corresponding to the bore 14 of the work piece 13 and has multiple perforated grooves 35. As shown in FIG. 2, the grooves 35 are shaped to correspond to the fluid bearing grooves to be formed on the work piece 13. The grooves 35 consist of multiple perforated grooves formed in a circumferential direction of the mask member 12. The grooves 35 include a set of thrust grooves 36a and a set of radial grooves 36b. The thrust grooves 36a are provided in the cone section 31 of the mask member 12 and the radial grooves 36b are provided in the cylinder section 32 of the mask member 12. Consequently, in the area of the thrust grooves 36a, the conical inner surface 13B of the work piece 13 and the cone section 31 of the electrode section 11 directly face each other, while in the area of the radial grooves 36b, the cylindrical inner surface 13A of the work piece 13 and the cylinder section 32 of the electrode section 11 directly face each other.

Inside of the electrode section 11, a central hole 16 extends along a central line of the electrode section 11 from one end (on the right side of the figure) to a boundary between the cone section 31 and cylinder section 32 to form an electrolytic solution pathway 39, which allows an electrolytic solution to flow and branch out to the grooves 36a and 36b provided in the mask member 12. The central hole 16 communicates with holes 40 that radiate toward the outer circumference along the boundary. The holes 40 are large enough to allow the electrolytic solution to branch out and flow to one end of each of the grooves 36a and 36b, and the holes 40 are designed to evenly distribute the flow of the electrolytic solution to the ends of the grooves 36a and 36b.

Stepped sections are formed by concave areas 37 and 38 adjacent the tip of the cone section 31 of the electrode section 11 (on the left side of the figure) and at a rear end of the cylinder section 32 (on the right side of the figure), respectively. The concave areas 37 and 38 allow the electrolytic solution that has flowed out of the electrolytic solution pathway 39 to the grooves 35 on the mask member 12 to further flow outward. The concave area 37 communicates with one end of each of the grooves 36a on the mask member 12 and extends from the front end of each of the grooves 36a along the axial direction to the tip of the cone section 31. The concave area 38 communicates with one end of each of the grooves 36b on the mask member 12 and extends from the rear end of each of the grooves 36b along the axial direction to the rear end of the cylinder section 32. The electrode section 11 with the mask member 12 affixed thereto is closely adhered to the inner circumferential surface of the bore 14 of the work piece 13 to form the grooves.

Figure 4:
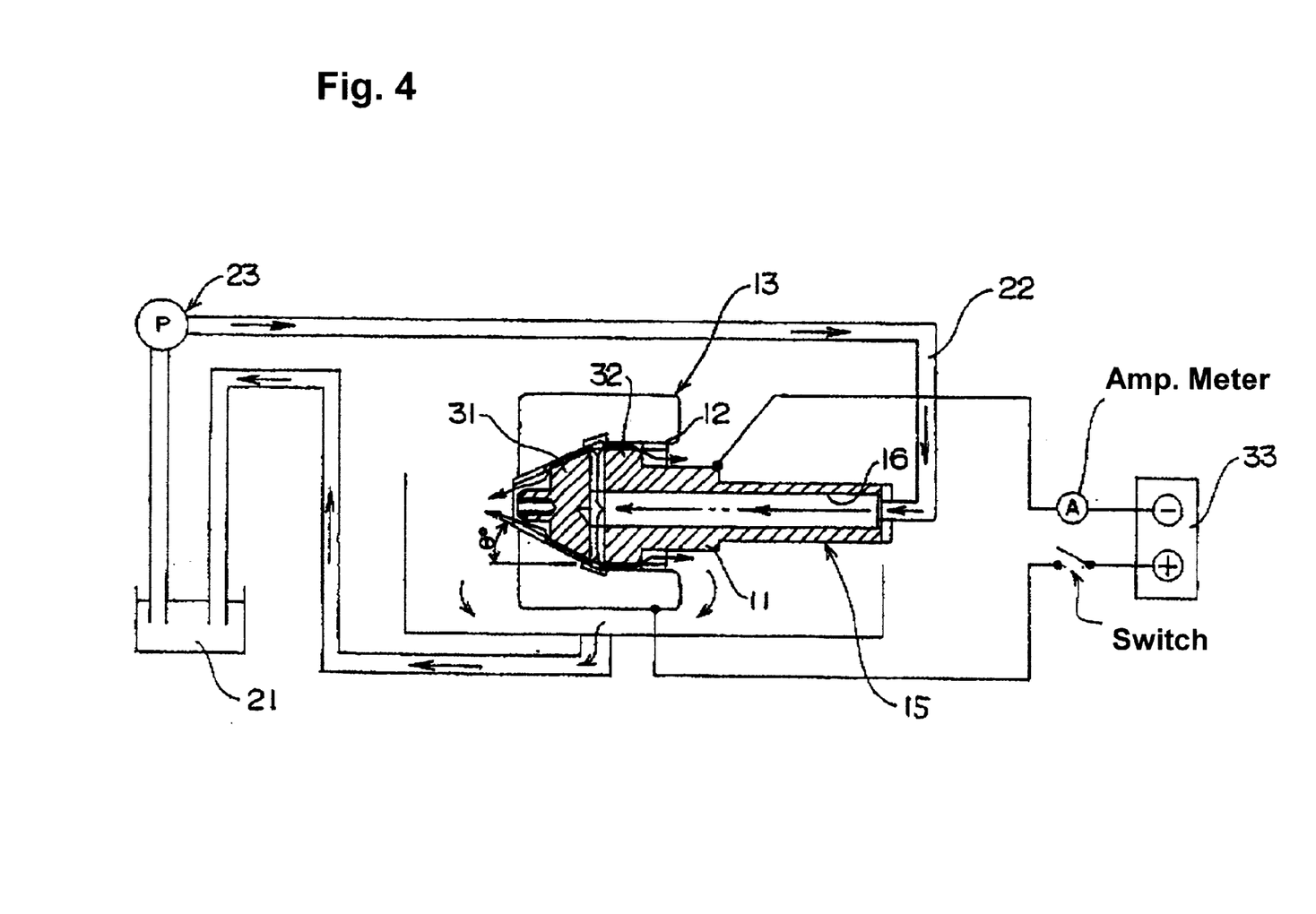
FIG. 4 is a piping diagram used in a method for manufacturing a fluid bearing in accordance with an embodiment of the present invention.

Next, a method for manufacturing the fluid bearing concerning in accordance with an embodiment of the present invention is described below with reference to FIGS. 4 and 5. As shown in FIG. 4, a direct current pulse power source 33 is connected in a manner that the work piece 13, which is a bearing material composed of a conductive material, is connected to a positive pole and the electrode 11 is connected to a negative pole. As indicated by arrows in FIG. 4, an electrolytic solution 22 is supplied from the central hole 16 of the electrode section 11 to the interior. Then, the electrolytic solution 22 branches off into the holes 40, branches off again towards the cone section 31 and the cylinder section 32 at the outer circumference of the electrode section 11, and passes through the grooves 36a and 36b of the mask member 12 to the exterior. Once the electrolytic solution 22 flows outside, it is collected in an electrolytic solution tank 21 and then supplied again to an electrolytic machining area 24 by an electrolytic solution supply pump 23, such that the electrolytic solution 22 is circulated through the piping system, as shown in FIG. 5.

Figure 5:
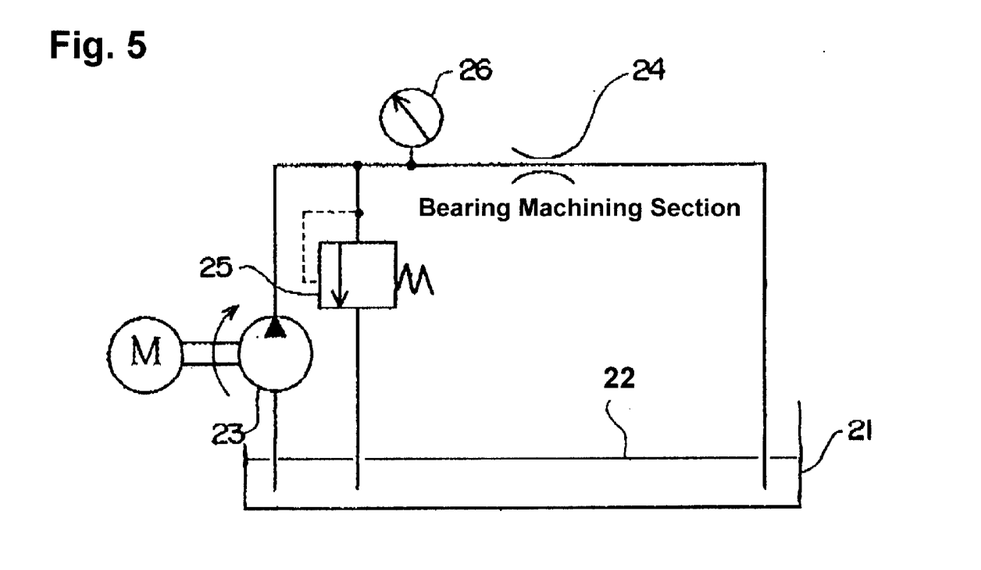
FIG. 5 is a piping diagram used in a method for manufacturing a fluid bearing in accordance with an embodiment of the present invention.

As shown in FIG. 5, a relief valve 25 and a pressure gauge 26 are provided upstream of the bearing machining area 24, and the relief valve 25 and the pressure gauge 26 control the flow of the electrolytic solution 22 by adjusting the differential pressure. The supply side of the piping system is a closed system, so that air would not be enter the piping system.

Figure 6:
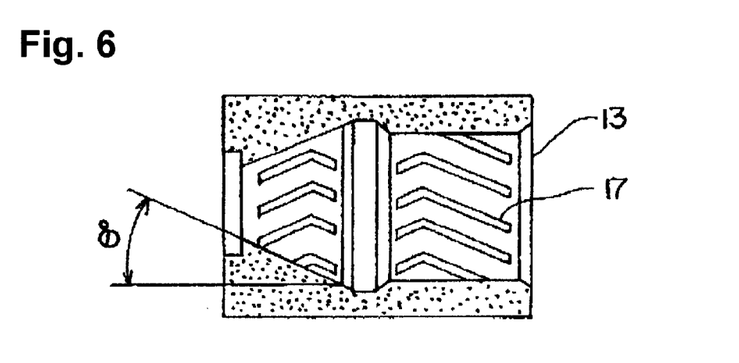
FIG. 6 is a cross-sectional view of a fluid bearing manufactured by a fluid bearing manufacturing method in accordance with an embodiment of the present invention.

Next, electricity is provided from the direct current pulse power source 33 in the range of 5V~15V. At this moment, portions of the inner circumferential surface of the work piece 13, which face the grooves 36a and 36b on the mask member 12 that is made of an insulating material, are cut by the electrolytic solution through an electrolytic action with electrode section 11. As a consequence, grooves 17 with shapes corresponding to the grooves 36a and 36b are formed at two places along the axial direction of the bearing on the inner circumferential surface of the work piece 13, as shown in FIG. 6. The shape of the grooves 17 can be curved, as shown in FIG. 2, or angular, as shown in FIG. 6, and any shape publicly known can be used to suit the purpose.

Electrolytic machining through pulses is repeated until the prescribed groove depth is obtained. Once the prescribed groove depth is obtained, the pulse power source 33 is turned off. Normally, since the groove depth ranges between several μm and over 10 μm, which requires a few seconds of machining time, and numerous grooves can be machined in a short period of time, the present method is suitable for mass production machining and to achieve cost reduction.

Because the pulse power source 33 has a built-in timer and the pulse width and number of pulses can be varied to specified values, machining process can be automated. Preferably, the electrode 11 may be made with SUS420J2 or a copper based material, and the mask member 12 may be made with a non-conductive resin.

The conditions for electrolytic machining are as follows:

Electrolytic solution: $NaNO_3$ in 30% weight ratio,

Pulse on-off setting precision in units of 1 ms,

Duty 10%, On-time 3~7 ms, and Voltage 4~15V.

According to the present invention, grooves for generating radial dynamic pressure and grooves for generating thrust dynamic pressure are provided in a cone section and a cylinder section of a fluid bearing, respectively. As a result, a radial bearing and a thrust bearing are formed in one unitary structure. Accordingly, as long as a sufficient roundness is secured for a bearing member in its blank state before machining to form a fluid bearing, a good concentricity can be readily obtained between the thrust bearing and the radial bearing, and thereby the quality of the bearing is stabilized.

The electrode section 11 of the manufacturing tool has two groove forming surfaces along the axial direction where the mask member 12 is attached. The two groove forming surfaces are defined by the outer circumference surfaces of the cone section 31 and the cylinder section 32, which form an angle θ with respect to each other. The angle θ can be set within the range of $0° \leq \theta \leq 90°$. In accordance with the embodiment of the present invention, by changing the angle θ defined between the two groove forming surfaces, the balance between the thrust force and the radial force can be changed easily.

Figure 10:
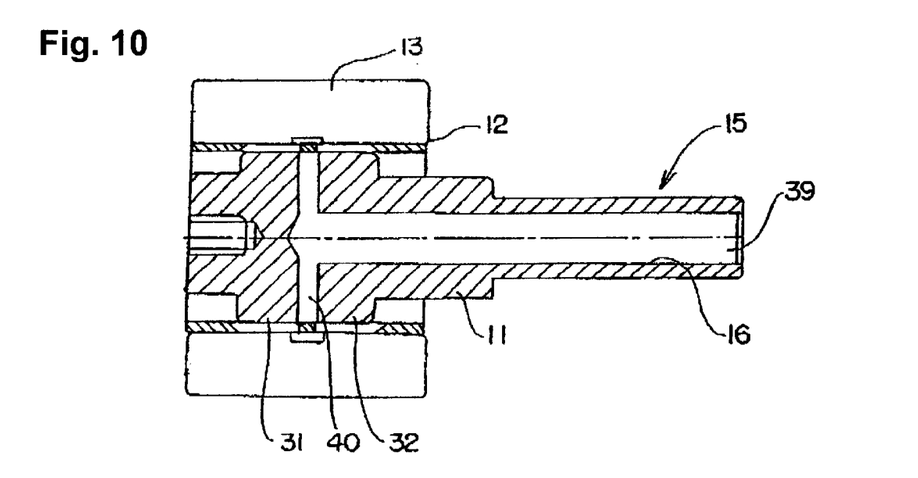
FIG. 10 is a cross-sectional view of an example of a fluid bearing manufacturing tool in accordance with an embodiment of the present invention.

When the angle θ=0°, the fluid bearing only have two radial bearing functions, as shown in FIG. 10. On the other hand, when the angle θ=90°, a fluid bearing with a purely thrust bearing function and a radial bearing function can be formed.

Figure 7:
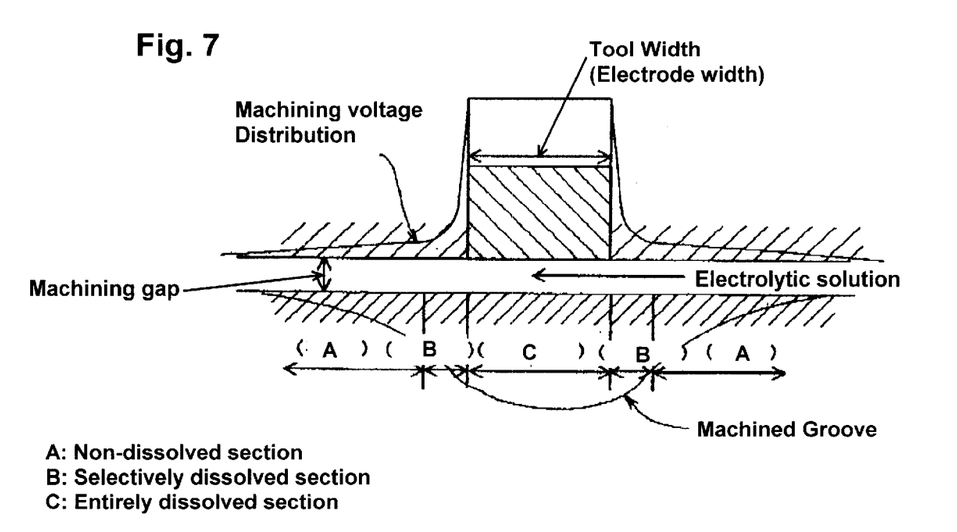
FIG. 7 is a cross-sectional view of a groove, illustrating the relationship between an electrode width and a width of the groove formed in a fluid bearing manufactured by the conventional machining method.
Figure 8:
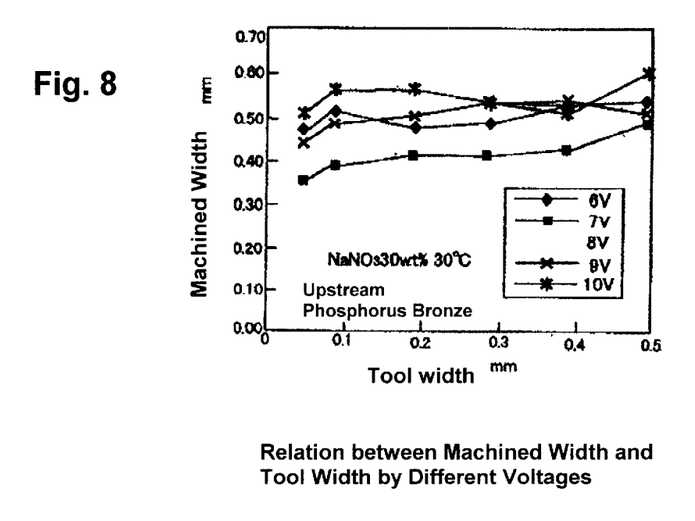
FIG. 8 is a graph indicating the relationship between electrode widths and widths of grooves formed in a fluid bearing manufactured by the conventional machining method.

In accordance with the embodiment of the present invention, the cross-sectional shape of each of the grooves for generating dynamic pressure may be rectangular. In a general electrolytic machining method, the machining voltage distribution has a gentler curve for the electrode width, as shown in FIG. 7, and this causes the shape of the machined grooves formed by electrolytic machining to be dull. Therefore, when a conventional machining method is employed, a machining width becomes 0.3~0.6 mm larger than a tool width (electrode width) when the tool width is changed between 0.1 mm and 0.5 mm, with the machining voltage ranging between 6V and 10V, as indicated by a graph shown in FIG. 8. In addition, it is conceivable that stray current could aggravate the surface roughness of the surrounding area.

Figure 9:
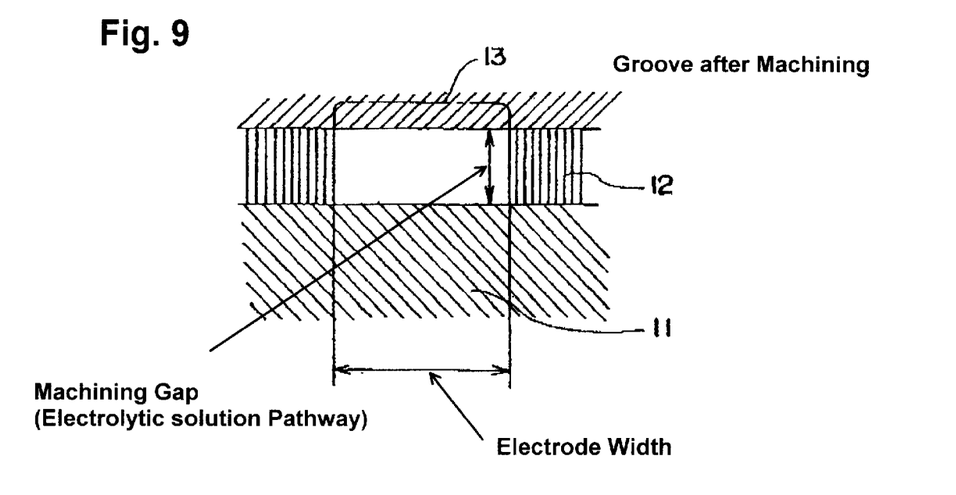
FIG. 9 is a cross-sectional view of an example of a groove formed in accordance with the present invention.

However, in accordance with the present invention, the mask member 12 closely adheres to the surfaces of both of the electrode section 11 of the manufacturing tool and the work piece 13, as shown in FIG. 9. As a result, the electrolytic solution works only on portions of the work piece 13 that are exposed to the grooves 36a and 36b on the mask member 12. In other words, only areas on the work piece 13 where grooves are to be formed are exposed to a pathway through which the electrolytic solution flows, and the other areas than the areas exposed to the electrolytic solution pathway are closed off by the mask member 12 that is made of an insulating material. As a result, the electrolytic solution does not pass through beyond an electrode width that is defined by each of the grooves 36a and 36b on the mask member 12. Consequently, electrolytic machining does not take place except along the electrolytic solution pathway, and a highly accurate groove with a rectangular cross-section and without dullness can be formed on the work piece 13.

Figure 3:
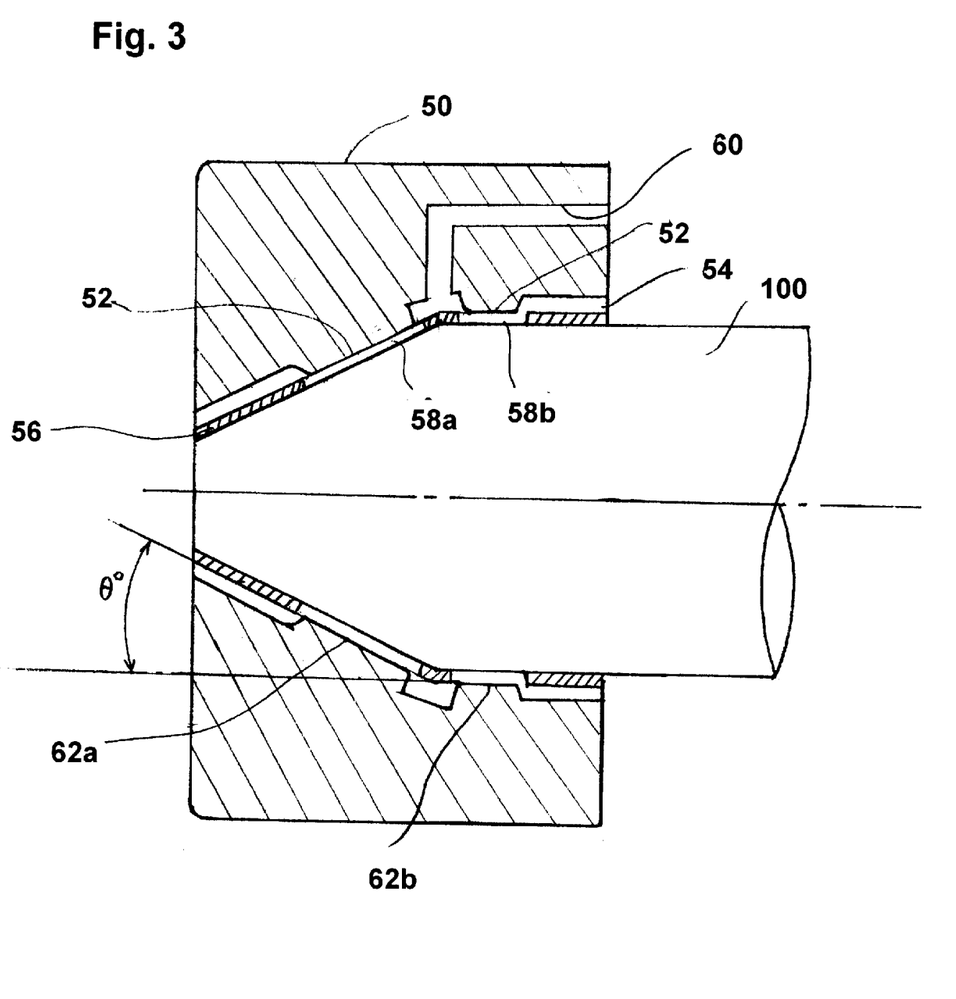
FIG. 3 is a cross-sectional view of a fluid bearing in accordance with another embodiment of the present invention.

In the method for manufacturing the fluid bearing described above, dynamic pressure generating grooves are formed on the work piece 13 that is a sleeve section. However, such grooves can be formed on a rotary shaft 100 of a fluid bearing by using a fluid bearing manufacturing tool 50 that is provided with an electrode section 52 having shapes corresponding to the external shape of the rotary shaft 100, as shown in FIG. 3.

In this case, the components have opposite relations to the ones described in the earlier embodiment. In accordance with one embodiment of the present invention, as shown in FIG. 3, the rotary shaft 100, which is the work piece, is inserted into a hole 54 formed in the fluid bearing manufacturing tool 50. An electrolytic solution is allowed to flow between the manufacturing tool 50 and the rotary shaft 100, an electrolytic machining power source is connected between the manufacturing tool 50 and the rotary shaft 100, and fluid bearing grooves are formed with an electrolytic action of the electrolytic solution on the outer surface of the rotary shaft 100.

A mask member 56 with a set of grooves 58a and 58b is affixed on the inner surface of the electrode section of the manufacturing tool 50 to which the power source for electrolytic machining is connected. The set consisting of multiple grooves in a shape corresponding to the fluid bearing grooves at two places along the axial direction. An electrolytic solution is flown into the grooves 58a and 58b on the mask member 56, to simultaneously form fluid bearing grooves at two places along an axial direction of the work piece 100 on the outer surface of the work piece 100 facing the respective groove sets 58a and 58b. As a result, two radial bearings or a thrust bearing and a radial bearing can be integrally formed as a unitary structure, which would result in superior perpendicularity, greatly improved quality and significantly improved motor performance.

In the manufacturing tool 50, an electrolytic solution pathway 60 is formed in the electrode section 52 in a manner to allow the electrolytic solution to branch out and flow into groove sets 58a and 58b at two places on the mask member 56 along the axial direction. The electrode section 52 of the manufacturing tool 50 includes two groove forming surfaces 62a and 62b along the axial direction where the mask member 56 is attached that form an angle θ, where the angle θ is in the range $0° \leq \theta \leq 90°$. By changing the angle θ, the thrust force and the radial force can be altered to manufacture fluid bearings according to the requirements.

In accordance with the present invention, a fluid bearing is manufactured by the following method. A mask member having at least two sets of grooves provided at least two places along an axial direction is affixed to an outer surface of an electrode section of a fluid bearing manufacturing tool. Each of the groove sets consists of multiple grooves in a shape corresponding to designed fluid bearing grooves on a work piece, such as, for example, a sleeve section of the fluid bearing. The fluid bearing manufacturing tool is inserted into a hole created in the work piece, wherein a power source for electrolytic machining is connected between the fluid bearing manufacturing tool and the work piece. An electrolytic solution between the manufacturing tool and the work piece is allowed to flow to form fluid bearing grooves on an inner surface of the work piece through electrolytic machining.

In one aspect of the embodiment, the electrolytic solution is allowed to flow into the grooves in the mask member to simultaneously form two sets of fluid bearing grooves at two places along the axial direction on the inner surface of the work piece facing the respective groove sets.

As a result, the fluid bearing grooves can be simultaneously formed at two places through electrolytic machining on the inner surface of the work piece facing each of the groove sets provided in the mask member. As a result, at least two radial bearings or a thrust bearing and a radial bearing can be integrally formed in the work piece, which allows the manufacture of fluid bearings with superior perpendicularity and greatly improved quality.

In addition, because the grooves are formed by electrolytic machining, burrs that may occur in mechanical machining are not created on the work piece, and metal chips that may be generated within the grooves will be dissolved and discharged such that metal-burning by metal chips does not occur. As a result, the quality can be significantly stabilized.

In accordance with another embodiment of the present invention, a fluid bearing may also be manufactured by the following method. A mask member having at least two sets of grooves provided at least two places along an axial direction is affixed to an inner surface of an electrode section of a fluid bearing manufacturing tool. Each of the groove sets consists of multiple grooves in a shape corresponding to designed fluid bearing grooves on a work piece, such as, for example, a rotary shaft that is mounted in the fluid bearing. The work piece is inserted into a hole created in the fluid bearing manufacturing tool, wherein a power source for electrolytic machining is connected between the fluid bearing manufacturing tool and the work piece. An electrolytic solution between the manufacturing tool and the work piece is allowed to flow to form fluid bearing grooves on an outer surface of the work piece through electrolytic machining.

In one aspect of the embodiment, the electrolytic solution is allowed to flow into the grooves in the mask member to simultaneously form two sets of fluid bearing grooves at two places along the axial direction on the outer surface of the work piece facing the respective groove sets.

As a result, the fluid bearing grooves can be simultaneously formed at two places through electrolytic machining on the outer surface of the work piece facing each of the groove sets provided in the mask member. As a result, at least two radial bearings or a thrust bearing and a radial bearing can be formed on the work piece, which allows the manufacture of fluid bearings with superior perpendicularity and greatly improved quality.

In addition, because the grooves are formed by electrolytic machining, burrs that may occur in mechanical machining are not created on the work piece, and metal chips that may be generated within the grooves will be dissolved and discharged such that metal-burning by metal chips does not occur. As a result, the quality can be significantly stabilized.

Moreover, in accordance with another embodiment of the present invention, a fluid bearing includes a bearing section that rotatably supports a rotary shaft. Two sets of grooves to generate dynamic pressure are formed on the inner surface of the bearing or on the outer surface of the rotary shaft. Lubrication fluid is allowed to flow in the grooves so that the dynamic pressure is generated by the relative rotation between the rotating shaft and the bearing. The two grooves sets, each consisting of multiple grooves, are provided at two places along the axial direction of the rotary shaft.

The two groove sets are formed in two groove forming surfaces of either the bearing or the rotary shaft. Each of the two groove forming surfaces forms an angle $\theta$ with respect to the axial direction of the rotary shaft, where the angle $\theta$ is in the range $0° \leq \theta \leq 90°$, and the cross-sectional shape of each of the grooves is rectangular. In one embodiment, one of the two groove forming surfaces extends in the axial direction, and the other groove forming surface may be angled with respect to the axial direction.

As a result, fluid bearings with variety of different bearing sets, such as, for example, two radial bearings, a set of thrust and radial bearings or the like can be structure, by changing the angle $\theta$ ($0°$~$90°$).

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for manufacturing a fluid bearing, in which a fluid bearing manufacturing tool is inserted into a hole created in a work piece and electrolytic solution is allowed to flow between the manufacturing tool and the work piece, and a power source for electrolytic machining is connected between the manufacturing tool and the work piece, to form fluid bearing grooves on an inner surface of the work piece through electrolytic machining, the method comprising the steps of:

affixing a mask member with at least two grove sets, each of the two groove sets consisting of a plurality of grooves in a shape corresponding to the fluid bearing grooves, in at least two places along an axial direction on an outer surface of an electrode section of the manufacturing tool to which the power source for electrolytic machining is connected;

flowing the electrolytic solution into the plurality of grooves of the two groove sets in the mask member; and forming fluid bearing grooves simultaneously at two places along the axial direction on the inner surface of the work piece facing the two groove sets;

and wherein:

the fluid bearing manufacturing tool is comprised of a main body which is made of an electrode part;

the mask member provided with at least two groove sets is tightly interposed between the work piece and the electrode part of the manufacturing tool in such a manner that the work piece and the electrode part are directly opposed to each other only in positions of the plurality of grooves provided with the mask member; and the main body of the manufacturing tool has a solution passage to allow the electrolytic solution to flow to the respective grooves and the electrolytic solution performs an electrolytic action only in the shape of the plurality of grooves.

2. A method for manufacturing a fluid bearing according to claim 1, further comprising the steps of;

forming an electrolytic solution pathway inside the electrode section of the manufacturing tool to allow the electrolytic solution to branch out and flow to the groove sets at two places in the mask member;

adhering the mask member closely to an inner circumference surface of the work piece; and flowing the electrolytic solution only to the grooves in the mask member to form fluid bearing grooves on the inner surface of the work piece facing the groove sets.

3. A method for manufacturing a fluid bearing according to claim 2, further comprising the step of providing the electrode section of the manufacturing tool with two groove forming surfaces along the axial direction where the mask member is attached, the two groove forming surfaces defining an angle θ against the axial direction, where the angle θ is $0° \leq \theta \leq 90°$.

4. A method for manufacturing a fluid bearing according to claim 3, wherein the angle θ is 0° and the two groove forming surfaces on the work piece are provided with two sets of radial bearing grooves along the axial direction of the manufacturing tool.

5. A method for manufacturing a fluid bearing according to claim 2, wherein the electrolytic solution pathway formed within the electrode section of the manufacturing tool has a central electrolytic solution pathway formed along the axial direction in a center of the electrode section and a plurality of holes extending from the central electrolytic solution pathway in a radial direction toward an outer circumference of the manufacturing tool between the two groove sets in the mask member, the plurality of holes communicating with the grooves in the mask member at two places along the axial direction.

6. A method for manufacturing a fluid bearing according to claim 1, wherein the work piece is made of a conductive material and the electrode section of the manufacturing tool are connected to a direct current pulse power source so that the work piece is set at a positive pole and the electrode section of the manufacturing tool is set at a negative pole, and the electrolytic solution is allowed to flow from the interior of the electrode section through the outer circumference of the electrode section to an exterior thereof.

7. A method for manufacturing a fluid bearing, in which a fluid bearing manufacturing tool is inserted into a hole created in a work piece and electrolytic solution is allowed to flow between the manufacturing tool and the work piece, and a power source for electrolytic machining is connected between the manufacturing tool and the work piece, to form fluid bearing grooves on an inner surface of the work piece through electrolytic machining, the method comprising the steps of:

affixing a mask member with at least two grove sets, each of the two groove sets consisting of a plurality of grooves in a shape corresponding to the fluid bearing grooves, in at least two places along an axial direction on an outer surface of an electrode section of the manufacturing tool to which the power source for electrolytic machining is connected;

flowing the electrolytic solution into the plurality of grooves of the two groove sets in the mask member;

forming fluid bearing grooves simultaneously at two places along the axial direction on the inner surface of the work piece facing the two groove sets;

forming an electrolytic solution pathway inside the electrode section of the manufacturing tool to allow the electrolytic solution to branch out and flow to the groove sets at two places in the mask member;

adhering the mask member closely to an inner circumference surface of the work piece;

flowing the electrolytic solution only to the grooves in the mask member to form fluid bearing grooves on the inner surface of the work piece facing the groove sets; and providing the electrode section of the manufacturing tool with two groove forming surfaces along the axial direction where the mask member is attached, the two groove forming surfaces defining an angle θ against the axial direction, where the angle θ is $0° \leq \theta \leq 90°$;

wherein the angle θ is 90° and the two groove forming surfaces on the work piece are provided with a set of radial bearing grooves and a set of thrust bearing grooves, respectively, along the axial direction on the manufacturing tool.

8. A method for manufacturing a fluid bearing, in which a work piece is inserted into a hole created in a fluid bearing manufacturing tool, an electrolytic solution is allowed to flow between the manufacturing tool and the work piece, and a power source for electrolytic machining is connected between the manufacturing tool and the work piece, to form fluid bearing grooves on an outer surface of the work piece through electrolytic machining, the method comprising the steps of:

affixing a mask member with at least two groove sets, each of the two groove sets consisting of a plurality of grooves in a shape corresponding to the fluid bearing grooves, in at least two places along an axial direction on an inner surface of an electrode section of the manufacturing tool to which the power source for electrolytic machining is connected;

flowing the electrolytic solution into the plurality of grooves of the two groove sets in the mask member; and forming fluid bearing grooves simultaneously at two places along the axial direction on the outer surface of the work piece facing the two groove sets;

and wherein:

the fluid bearing manufacturing tool is comprised of a main body which is made of an electrode part;

the mask member provided with at least two groove sets is tightly interposed between the work piece and the electrode part of the manufacturing tool in such a manner that the work piece and the electrode part are directly opposed to each other only in positions of the plurality of grooves provided with the mask member; and the main body of the manufacturing tool has a solution passage to allow the electrolytic solution to flow to the respective grooves and the electrolytic solution performs an electrolytic action ending in the shape of the plurality of grooves.

9. A method for manufacturing a fluid bearing according to claim 8, further comprising the steps of;

forming an electrolytic solution pathway inside the electrode section of the manufacturing tool to allow the electrolytic solution to branch out and flow to the groove sets at two places in the mask member;

adhering the mask member closely to an outer circumferential surface of the work piece; and flowing the electrolytic solution only to the grooves in the mask member to form fluid bearing grooves on the inner surface of the work piece facing the groove sets.

10. A method for manufacturing a fluid bearing according to claim 9, further comprising the step of providing the electrode section of the manufacturing tool with two groove forming surfaces along the axial direction where the mask member is attached, the two groove forming surfaces defining an angle θ against the axial direction, where the angle θ is 0°≦θ≦90°.

11. A method for manufacturing a fluid bearing according to claim 10, wherein the angle θ is 0° and the two groove forming surfaces on the work piece are formed with two sets of radial bearing grooves along the axial direction of the manufacturing tool.

12. A method for manufacturing a fluid bearing according to claim 9, wherein the electrolytic solution pathway formed within the electrode section of the manufacturing tool has a plurality of holes communicating with a midpoint between the two sets of grooves on the mask member along the axial direction on the manufacturing tool, and the plurality of holes connect to the grooves provided at two places on the mask member along the axial direction on the manufacturing tool.

13. A method for manufacturing a fluid bearing according to claim 11, wherein the work piece is made of a conductive material and the electrode section of the manufacturing tool are connected to a direct current pulse power source so that the work piece is set at a positive pole and the electrode section of the manufacturing tool is set at a negative pole, and the electrolytic solution is allowed to flow from the interior of the electrode section through the inner circumferential surface of the electrode section to an exterior thereof.

14. A method for manufacturing a fluid bearing, in which a work piece is inserted into a hole created in a fluid bearing manufacturing tool, an electrolytic solution is allowed to flow between the manufacturing tool and the work piece, and a power source for electrolytic machining is connected between the manufacturing tool and the work piece, to form fluid bearing grooves on an outer surface of the work piece through electrolytic machining, the method comprising the steps of:

affixing a mask member with at least two groove sets, each of the two groove sets consisting of a plurality of grooves in a shape corresponding to the fluid bearing grooves, in at least two places along an axial direction on an inner surface of an electrode section of the manufacturing tool to which the power source for electrolytic machining is connected;

flowing the electrolytic solution into the plurality of grooves of the two groove sets in the mask member;

forming fluid bearing grooves simultaneously at two places along the axial direction on the outer surface of the work piece facing the two groove sets;

forming an electrolytic solution pathway inside the electrode section of the manufacturing tool to allow the electrolytic solution to branch out and flow to the groove sets at two places in the mask members;

adhering the mask member closely to an outer circumferential surface of the work piece;

flowing the electrolytic solution only to the grooves in the mask member to form fluid bearing grooves on the inner surface of the work piece facing the groove sets;

providing the electrode section of the manufacturing tool with two groove forming surfaces along the axial direction where the mask member is attached, the two groove forming surfaces defining an angle θ against the axial direction, where the angle θ is 0°≦θ≦90°;

wherein the angle θ is 90° and the two groove forming surfaces on the work piece are formed with a set of radial bearing grooves and a set of thrust bearing grooves, respectively, along the axial direction on the manufacturing tool.

* * * * *